United States Patent
Korja et al.

(10) Patent No.: US 12,021,827 B2
(45) Date of Patent: Jun. 25, 2024

(54) APPARATUS, METHOD AND COMPUTER PROGRAM TO INFLUENCE 3GPP TERMINALS ON PREFERENCES BETWEEN MULTIPLE RECURSIVE DNS SERVERS

(71) Applicant: NOKIA TECHNOLOGIES OY, Espoo (FI)

(72) Inventors: Pekka Korja, Kauniainen (FI); Markus Isomäki, Espoo (FI); Laurent Thiebaut, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/906,442

(22) PCT Filed: Mar. 16, 2020

(86) PCT No.: PCT/EP2020/057155
§ 371 (c)(1),
(2) Date: Sep. 15, 2022

(87) PCT Pub. No.: WO2021/185429
PCT Pub. Date: Sep. 23, 2021

(65) Prior Publication Data
US 2023/0362127 A1    Nov. 9, 2023

(51) Int. Cl.
*H04L 61/4511*    (2022.01)
*G06F 15/16*    (2006.01)
(Continued)

(52) U.S. Cl.
CPC .... *H04L 61/4511* (2022.05); *H04L 2101/677* (2022.05)

(58) Field of Classification Search
CPC ............. H04L 61/4511; H04L 2101/677
(Continued)

(56) References Cited

U.S. PATENT DOCUMENTS

2011/0170517 A1* 7/2011 Bakker ............... H04W 36/125
370/328
2011/0295940 A1* 12/2011 Saleem ............... H04L 61/4511
709/203
(Continued)

FOREIGN PATENT DOCUMENTS

| CA | 2990435 C | * | 6/2020 | .......... G06F 16/951 |
| CA | 3058299 C | * | 5/2022 | .......... G06F 16/1824 |
| WO | WO-2018127021 A1 | * | 7/2018 | .......... H04L 5/0007 |

OTHER PUBLICATIONS

"3rd Generation Partnership Project; Technical Specification Group Core Network and Terminals; 5G System; Network Exposure Function Northbound APIs; Stage 3 (Release 16)", 3GPP TS 29.522 v16.2.0, (Dec. 2019), 106 pages.
(Continued)

*Primary Examiner* — David R Lazaro
*Assistant Examiner* — Berhanu Shitayewoldetadik
(74) *Attorney, Agent, or Firm* — Lippes Mathias LLP

(57) ABSTRACT

There is provided an apparatus, said apparatus comprising means for determining, at a first core network entity, an indication of domains supported on a data network, determining domain name system configuration information based at least on the indication of domains supported on the data network and providing the domain name system configuration information to a second core network entity.

3 Claims, 10 Drawing Sheets

(51) Int. Cl.
*G06F 15/177* (2006.01)
*H04L 12/26* (2006.01)
*H04L 12/58* (2006.01)
*H04L 15/16* (2006.01)
*H04L 101/677* (2022.01)

(58) Field of Classification Search
USPC .......................................................... 709/224
See application file for complete search history.

(56) References Cited

U.S. PATENT DOCUMENTS

| | | | |
|---|---|---|---|
| 2014/0089523 A1 | 3/2014 | Roy et al. | |
| 2014/0313980 A1* | 10/2014 | Wang | H04L 65/1095 370/328 |
| 2016/0014689 A1* | 1/2016 | Malinen | H04W 12/086 455/434 |
| 2017/0220364 A1* | 8/2017 | Kadioglu | G06F 8/313 |
| 2019/0132776 A1* | 5/2019 | Markwart | H04W 36/0072 |
| 2020/0022069 A1* | 1/2020 | Salkintzis | H04W 48/14 |
| 2020/0389835 A1* | 12/2020 | Talebi Fard | H04W 12/40 |
| 2020/0412842 A1* | 12/2020 | Park | H04W 72/0453 |
| 2021/0058780 A1* | 2/2021 | Yu | H04W 12/08 |
| 2021/0092665 A1* | 3/2021 | Baek | H04W 48/18 |

OTHER PUBLICATIONS

"3rd Generation Partnership Project; Technical Specification Group Core Network and Terminals; Non-Access-Stratum (NAS) Protocol for 5G Systems (5GS); Stage 3; (Release 15)", 3GPP TS 24.501 v16.3.0 (Dec. 20, 2019), 645 pages.

"3rd Generation Partnership Project; Technical Specification Group Core Network and Terminals; User Equipment (UE) policies for 5G System (5GS); Stage 3 (Release 16)", 3GPP TS 24.526 v16.2.0, (Dec. 2019), 51 pages.

"3rd Generation Partnership Project; Technical Specification Group Services and System Aspects; Policy and charging control framework for the 5G System (5GS); Stage 2 (Release 16)", 3GPP TS 23.503 v16.3.0, (Dec. 2019), 112 pages.

"3rd Generation Partnership Project; Technical Specification Group Services and System Aspects; Procedures for the 5G System (5GS); Stage 2 (Release 16)", 3GPP TS 23.502 v16.3.0, (Dec. 2019), 558 pages.

"3rd Generation Partnership Project; Technical Specification Group Services and System Aspects; Study on enhancement of support for Edge Computing in 5G Core network (5GC) (Release 17)", 3GPP TR 23.748 v0.3.0, (Jan. 2020), 40 pages.

"3rd Generation Partnership Project; Technical Specification Group Services and System Aspects; System architecture for the 5G System (5GS); Stage 2 (Release 16)", 3GPP TS 23.501 v16.3.0, (Dec. 2019), 417 pages.

China Mobile, "Add FQDN to ANDSF ISRP Policies", 3GPP TSG SA WG2 Meeting #84, S2-111413, (Apr. 11-15, 2011), 2 pages.

Droms et al., "Authentication for DHCP Messages", Network Working Group, Request for Comments 3118, RFC 3118, (Jun. 2001), 17 pages.

International Search Report and Written Opinion for Patent Cooperation Treaty Application No. PCT/EP2020/057155 dated Oct. 21, 2020, 14 pages.

Jeong et al., "IPv6 Router Advertisement Options for DNS Configuration", Internet Engineering Task Force (IETF) Request for Comments 8106, RFC 8106, (Mar. 2017), 19 pages.

Mockapetris, P., "Domain Names—Implementation and Specification", Network Working Group, Request for Comments 1035, IETF RFC 1035, (Nov. 1987), 48 pages.

Savolainen et al., "Improved Recursive DNS Server Selection for Multi-Interfaced Nodes", Internet Engineering Task Force (IETF) Request for Comments, RFC 6731, (Dec. 2012), 29 pages.

T'Joens et al., "DHCP Reconfigure Extension", Network Working Group, Request for Comments 3203, RFC 3203, (Dec. 2001), 6 pages.

Wasserman, M., "Current Practices for Multiple-Interface Hosts", Internet Engineering Task Force (IETF) Request for Comments, RFC 6419, (Nov. 2011), 22 pages.

* cited by examiner

APPARATUS, METHOD AND COMPUTER PROGRAM TO INFLUENCE 3GPP TERMINALS ON PREFERENCES BETWEEN MULTIPLE RECURSIVE DNS SERVERS

CROSS-REFERENCE TO RELATED APPLICATIONS

This application is a national phase entry of International Application No. PCT/EP2020/057155, filed Mar. 16, 2020, the contents of which are hereby incorporated by reference in their entirety.

FIELD

Apparatus, method and computer program to influence 3GPP terminals on preferences between multiple recursive DNS servers.

The present application relates to a method, apparatus, system and computer program and in particular but not exclusively to SMF influence on preferences between multiple recursive DNS servers.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A UE may correspond to multiple form of devices including Residential Gateways connecting households to wireline and/or Wireless access The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus comprising means for determining, at a first core network entity, an indication of domains supported on a data network, determining domain name system configuration information based at least on the indication of domains supported on the data network and providing the domain name system configuration information to a second core network entity.

The indication of the domains supported on the data network may comprise a list or an array of application domain information.

The domains supported on the data network may be domains reachable by the data network or by local access to the data network.

The apparatus may comprise means for providing the domain name system configuration information as part of policy information to be sent to the user equipment.

The apparatus may comprise means for receiving the indication of domains supported on the data network from an application function.

The first core network entity may be configured with a further indication of domains supported on the data network and the apparatus may comprise means for determining which of the received indication of domains supported on the data network and the further indication of domains supported on the data network the domain name system configuration information is to be based on.

The first core network entity may be a policy control function. The second core network function may be a session management function.

The domain name system configuration information may comprise a domain name system server address associated with the data network and an associated priority.

In a second aspect there is provided an apparatus comprising means for determining domain name system configuration information and providing the domain name system configuration information to a user equipment.

The apparatus may comprise means for receiving the domain name system configuration information from a first core network entity at a second core network entity.

The first core network entity may be a policy control function. The second core network entity may be a session management function.

The apparatus may comprise means for receiving the domain name system configuration information as part of policy information.

The domain name system configuration information may comprise a domain name system server address associated with the data network and an associated priority.

In a third aspect there is provided a system comprising a user equipment, an apparatus according to any of the first aspect and an apparatus according to any of the second aspect.

In a fourth aspect there is provided a method comprising determining, at a first core network entity, an indication of domains supported on a data network, determining domain name system configuration information based at least on the indication of domains supported on the data network and providing the domain name system configuration information to a second core network entity.

The indication of the domains supported on the data network may comprise a list or an array of application domain information.

The domains supported on the data network may be domains reachable by the data network or by local access to the data network.

The method may comprise providing the domain name system configuration information as part of policy information to be sent to the user equipment.

The method may comprise receiving the indication of domains supported on the data network from an application function.

The first core network entity may be configured with a further indication of domains supported on the data network. The method may comprise determining which of the received indication of domains supported on the data network and the further indication of domains supported on the data network the domain name system configuration information is to be based on.

The first core network entity may be a policy control function. The second core network function may be a session management function.

The domain name system configuration information may comprise a domain name system server address associated with the data network and an associated priority.

In a fifth aspect there is provided a method comprising determining domain name system configuration information and providing the domain name system configuration information to a user equipment.

The method may comprise receiving the domain name system configuration information from a first core network entity at a second core network entity.

The first core network entity may be a policy control function. The second core network entity may be a session management function.

The method may comprise receiving the domain name system configuration information as part of policy information.

The domain name system configuration information may comprise a domain name system server address associated with the data network and an associated priority.

In a sixth aspect there is provided an apparatus comprising: at least one processor and at least one memory including a computer program code, the at least one memory and computer program code configured to, with the at least one processor, cause the apparatus at least to determine, at a first core network entity, an indication of domains supported on a data network, determine domain name system configuration information based at least on the indication of domains supported on the data network and provide the domain name system configuration information to a second core network entity.

The indication of the domains supported on the data network may comprise a list or an array of application domain information.

The domains supported on the data network may be domains reachable by the data network or by local access to the data network.

The apparatus may be caused to provide the domain name system configuration information as part of policy information to be sent to the user equipment.

The apparatus may be caused to receive the indication of domains supported on the data network from an application function.

The first core network entity may be configured with a further indication of domains supported on the data network and the apparatus may be caused to determine which of the received indication of domains supported on the data network and the further indication of domains supported on the data network the domain name system configuration information is to be based on.

The first core network entity may be a policy control function. The second core network function may be a session management function.

The domain name system configuration information may comprise a domain name system server address associated with the data network and an associated priority.

In a seventh aspect there is provided an apparatus comprising at least one processor and at least one memory including a computer program code, the at least one memory and computer program code configured to, with the at least one processor, cause the apparatus at least to: determine domain name system configuration information and providing the domain name system configuration information to a user equipment.

The apparatus may comprise be caused to receive the domain name system configuration information from a first core network entity at a second core network entity.

The first core network entity may be a policy control function. The second core network entity may be a session management function.

The apparatus may be caused to receive the domain name system configuration information as part of policy information.

The domain name system configuration information may comprise a domain name system server address associated with the data network and an associated priority.

In an eighth aspect there is provided a computer readable medium comprising program instructions for causing an apparatus to perform at least the following determining, at a first core network entity, an indication of domains supported on a data network, determining domain name system configuration information based at least on the indication of domains supported on the data network and providing the domain name system configuration information to a second core network entity.

The indication of the domains supported on the data network may comprise a list or an array of application domain information.

The domains supported on the data network may be domains reachable by the data network or by local access to the data network.

The apparatus may be caused to perform providing the domain name system configuration information as part of policy information to be sent to the user equipment.

The apparatus may be caused to perform receiving the indication of domains supported on the data network from an application function.

The first core network entity may be configured with a further indication of domains supported on the data network and the apparatus may be caused to perform determining which of the received indication of domains supported on the data network and the further indication of domains supported on the data network the domain name system configuration information is to be based on.

The first core network entity may be a policy control function. The second core network function may be a session management function.

The domain name system configuration information may comprise a domain name system server address associated with the data network and an associated priority.

In a ninth aspect there is provided computer readable medium comprising program instructions for causing an apparatus to perform at least the following determining domain name system configuration information and providing the domain name system configuration information to a user equipment.

The apparatus may be caused to perform receiving the domain name system configuration information from a first core network entity at a second core network entity.

The first core network entity may be a policy control function. The second core network entity may be a session management function.

The apparatus may be caused to perform receiving the domain name system configuration information as part of policy information.

The domain name system configuration information may comprise a domain name system server address associated with the data network and an associated priority.

In a tenth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
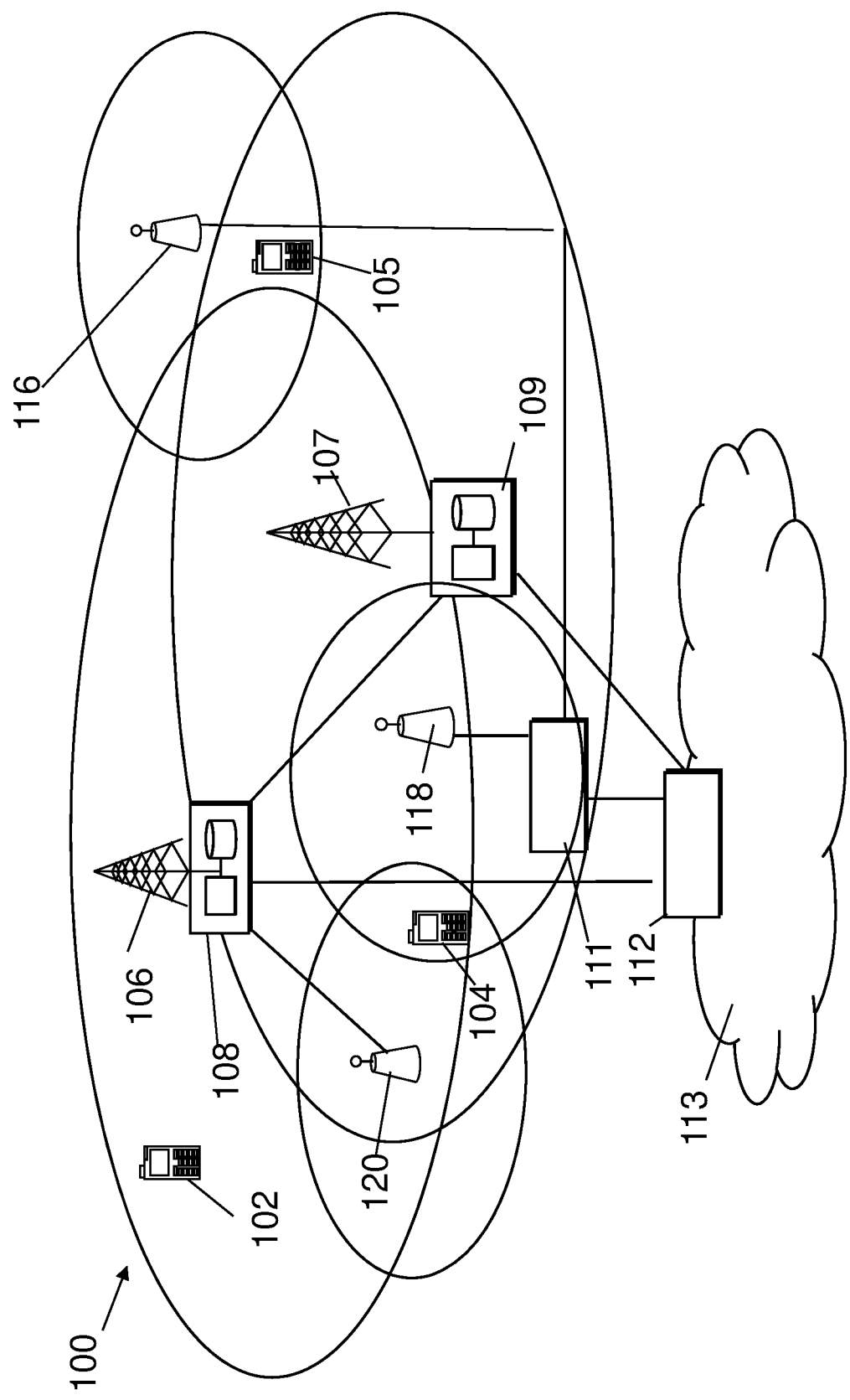
FIG. 1 shows a schematic diagram of an example communication system comprising a base station and a plurality of communication devices.

In a wireless communication system 100, such as that shown in FIG. 1, communication devices (e.g., user equipment (UE)) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a Radio Access Network (RAN) (e.g. wireless communication system 100) or in a core network (CN) (not shown) and may be implemented as one central apparatus or its functionality may be distributed over several apparatuses. The controller apparatus may be part of the base station and/or provided by a separate entity such as a radio network controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst base station 120 connects via the controller apparatus 108. In some embodiments, the smaller base stations may not be provided. Smaller base stations 116, 118 and 120 may be part of a second network, for example WLAN and may be WLAN Access Points (APs).

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements include at least Access and Mobility management Function (AMF), Session Management Function (SMF), User Plane Function (UPF) and Function (PCF). Mechanisms described in the document are applicable regardless of the access technology used for the User Equipment to connect to the network, e.g., 3GPP Radio technology such as NR, non 3GPP Radio technology as defined by IEEE, satellite access, wireline access etc.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). A User Plane Function (UPF) whose role is called PDU Session Anchor (PSA) may be responsible for forwarding frames back and forth between the data network (DN) and the tunnels established over the 5G towards the UE(s) exchanging traffic with the DN.

The UPF is controlled by a Session Management Function (SMF) that receives policies from a Policy Control Function (PCF). The CN may also include an Access & Mobility Function (AMF).

Figure 2:
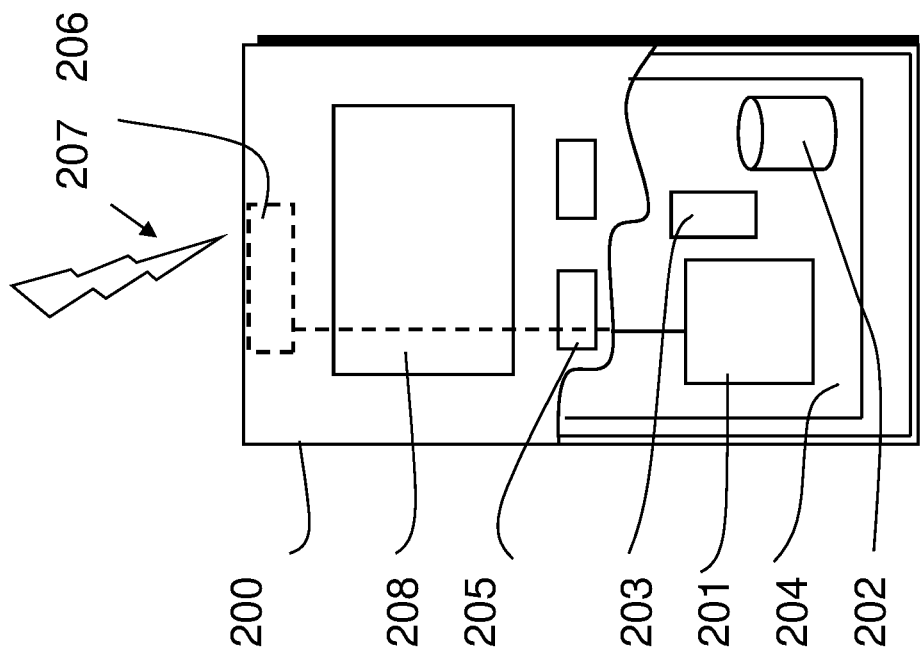
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
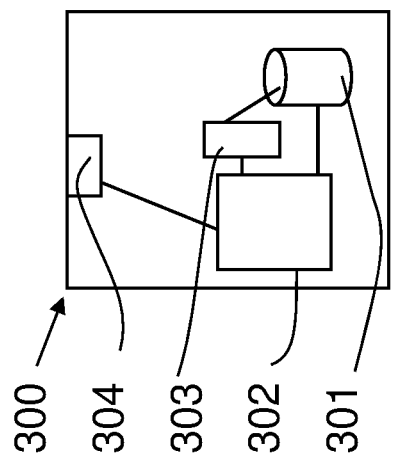
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Internet services may be hosted in multiple locations, with Domain Name System (DNS) mapping their hostname (e.g. 'app.example.com') to an IP address of a server, e.g. the server closest to the client.

In 5G, a UE may have multiple PDU Sessions with multiple PDU Session Anchors in order to support selective traffic routing to the Data Network (DN). A UE may establish multiple PDU Sessions, to the same data network or to different data networks, via 3GPP and via and Non-3GPP access networks at the same time. A UE may establish multiple PDU Sessions to the same Data Network and served by different UPF terminating N6. A UE with multiple established PDU Sessions may be served by different SMF.

The UE may be multi-homed at IP level. In this case, where a UE has established Multiple PDU Sessions, the UE is connected on Multiple IP links where each PDU Session corresponds to a different IP link. Each IP link may have its own IP configuration information, including the address of the DNS servers to be used on the link (on the PDU Session). The UE may thus have been configured with Multiple DNS servers, e.g., where the UE has received the address of different DNS servers on different PDU Sessions.

A Study Item on how to improve 3GPP support of Edge Computing is part of 3GPP R17 3GPP. With edge computing, the operators are able to host their own and/or 3rd party applications and content close to the user. Key Issues to be studied and Related Candidate solutions are documented in 3GPP TR 23.748.

In 5G, edge computing is supported by the 5G Core Network (5GC) selecting a UPF close to the UE (TS 23.501 section 5.13). Beyond this baseline there is a need for system enhancements for enhanced Edge Computing, for instance discovery of IP address of application server deployed in Edge Computing environment (TR 23.748).

A DN may be accessed via a UPF (user Plane Function) deployed centrally in the network but also via local UPF(s) deployed "near" to the 5G Access Networks. These various access to the same Data Networks are identified by a DNAI.

In order to support DHCP based IP address configuration, the SMF may as seen from the UE act as the DHCP server towards the UE. The SMF may also use a 3GPP specific protocol called NAS (defined in TS 24.501) to provide equivalent information to what can be provided via DHCP (IP levelconfiguration) using so called xPCO containers (Protocol Configuration Options)

The UE may acquire configuration information indicating address(es) of DNS server(s) from the SMF, during the lifetime of a PDU Session.

An application addressable by single Fully Qualified Domain Name (FQDN) may be provided by multiple parallel service instances. These service instances may offer the same or different service experience depending on from where the service is accessed and where the service instance is running. For instance, the content may differ depending on whether the service instance is running in public cloud or in multi-access edge computing facilities closer to UE. Local edge computing facilities may provide a shorter path to the same service than a public cloud and improve service performance, for example, latency.

On different PDU sessions or links available to UE there may be deployed distinct DNS servers that provide a recursive DNS resolution service, or recursive DNS server (RDNSS), as defined in [RFC 6731, RFC 8106] for translating domain names into IP addresses. Each RDNSS may have link specific knowledge of a given domain name space (or set of domain name spaces). For instance, only specific RDNSS may have knowledge of application services instances running at edge computing facilities reachable to UE only via a given data network (DN).

A mechanism should be specified in 5GS (or 5GC) to configure knowledge of specific domains and networks and related priorities via 5GS and to express which of the recursive DNS servers available to UE via multiple PDU sessions the UE should use and in which order to resolve an application FQDN.

Furthermore, "an edge computing hosting environment may have no connectivity with the central data network." (23.748-030 section 4.3 General Requirements and Assumptions). In this case, some services and applications may not be reachable via the stub IP network connected behind a PDU Session for local service. RFC 6731 refers to resolver as stub or proxy node that has ability to prioritize RDNSSes and handle responses with information on preferences and knowledge of specific domains and networks. The local DNS resolver in a stub network may not be able to reach other (authoritative DNS servers) for domains not served by the stub IP network connected behind a PDU Session for local services.

IETF RFC 6731 ("Improved Recursive DNS Server Selection for Multi-Interfaced Nodes") specifies how a DHCP server may express preferences for domains in DNS server information the DHCP server provides to DHCP client. An administrator may choose to utilize the different preference values, for instance by manual configuration (RFC 6731 section 3). RFC 6731 does not specify how the DHCP server acquires specific knowledge of domains and networks.

IETF RFC 8106 ("IPv6 Router Advertisement Options for DNS Configuration") specifies how Router Advertisement messages sent by Ipv6 Routers can advertise a list of DNS Recursive Server Addresses and a DNS Search List (DNSSL) to Ipv6 hosts. There is no definition of how to map IETF RFC 1086 with the multi-homing environment that the 3GPP supports where a UE has multiple PDU sessions. 3GPP defines (TS 23.501 § 5.6.7, TS 29.522 § 5.4.3.3.2) the Nnef_TrafficInfluence API where an Application Function (AF) can provide rules to the network. The rules may associate traffic related to an application (traffic identified via one of "application identifier(s) or traffic filter(s) where traffic filters relate to IP addresses, UDP/TCP ports or Ethernet Headers) with Traffic Routes identifying the N6 traffic routing requirement related with the identified traffic.

Conditions of applicability of the rule may be provided. The rules may apply to, e.g., a given DNN, S-NSSAI, an individual UE identifier (e.g., "gpsi", "ipv4Addr" or "ipv6Addr"), External Group Identifier (i.e. "externalGroupId") or a geographic zone: the AF request applies only to the traffic of UE(s) located in this specific zone. There may be an indication that the rule applies to any UE ("anyUeInd").

Traffic Routes (called RouteToLocation in TS 29.522 section 5.4.4.15) identifies the N6 traffic routing information associated with the location of the application, represented by data network access identifier (DNAI, i.e. a string identifying the data center where Application instances are hosted) and either Route Information or Routing profile ID. Route Information describes IPv4/IPv6 address and UDP port number of the tunnel end point in the data network. Routing profile ID is an abstract reference per DNAI that may be translated by the NEF and/or PCF into actual Route Information.

For UE Route Selection Policy (URSP), traffic descriptors (each associated with a precedence) may include one or more domain descriptors, that may correspond to a destination FQDN(s), and are associated with one or more route selection descriptors each consisting of a precedence value of the route selection descriptor and either PDU Session type and optionally other criteria such as DNN, S-NSSAI (slice), or non-seamless non-3GPP offload indication (TS 23.503 clause 6.6.2, TS 24.526 clause 4.2.1). URSP may be available to a UE by local configuration or communicated to a UE by PCF.

For every newly detected application the UE evaluates the URSP rules in the order of Rule Precedence and determines if the application is matching the Traffic descriptor of any URSP rule. (TS 23.503 section 6.6.2, 23.748; Connectivity models)

When a matching PDU Session exists, the UE associates the application to the existing PDU Session, i.e. routes the traffic of the detected application on this PDU Session. (TS 23.503 section 6.6.2)

If the UE determines that there is more than one existing PDU Session which matches with the same Rule Precedence, it is up to UE implementation to select one of the PDU sessions to use. (TS 23.503 section 6.6.2)

Even though a traffic descriptor in URSP, available to UE by local configuration or communicated to the UE by PCF, may contain destination FQDN, it is ambiguous how the URSP may be enforced to the DNS resolver at the UE. For instance, if WLAN interface at the UE side is not considered as non-3GPP network but completely configured by the end user or affiliate such as enterprise, that is without any MNO configuration or assistance, it is out of the scope of 3GPP how URSP would be able to affect the RDNSS configuration for DNS resolver within UE using the WLAN interface.

Figure 4:
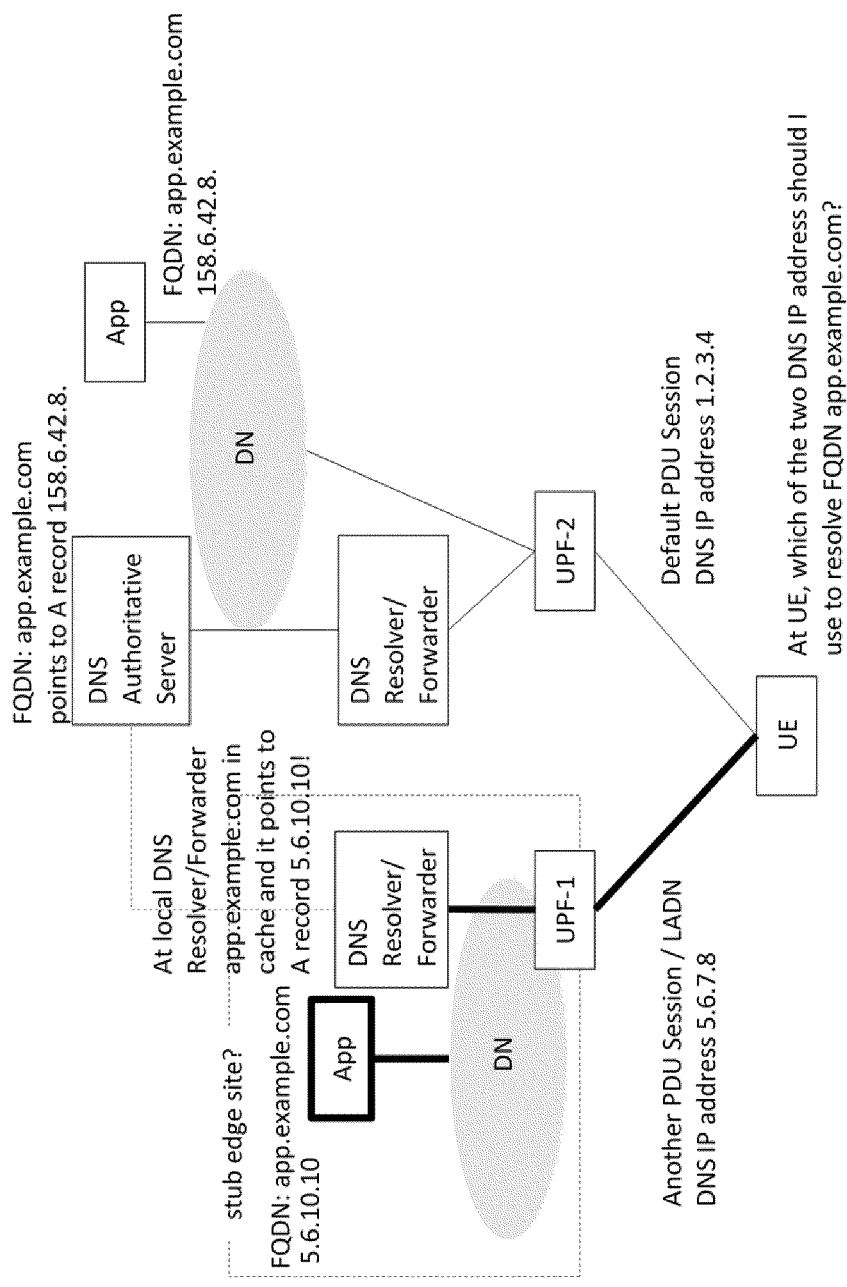
FIG. 4 shows a schematic diagram of an example 5GS architecture.

FIG. 4 illustrates an example architecture in which the UE has two PDU sessions each with a different DNS (server) IP address and the IE is unaware which of the two DNS (server) IP addresses to use to resolve the FQDN app.example.com.

A UE may be "multi homed" via multiple PDU Sessions (e.g. established to different (DNN, S-NSSAI)). Information on (different) DNS servers that the UE can use may be advertised on each of these different PDU Sessions. Currently, NAS (PCO), RA (IETF defined Router Advertisement messages), or DHCP are used to transfer this information to the UE but 3GPP currently does not define how to guide the UE to select the right DNS server.

IETF RFC 6731 ("Improved Recursive DNS Server Selection for Multi-Interfaced Nodes") specifies how a DHCP server can express preferences and domains for DNS server information it provides to a DHCP client. This information is called RDNSS Selection information. IETF RFC 8106 ("IPv6 Router Advertisement Options for DNS Configuration") specifies how Router Advertisement messages sent by IPV6 Routers can advertise a list of DNS Recursive Server Addresses and a DNS Search List (DNSSL) to IPv6 hosts.

Figure 5:
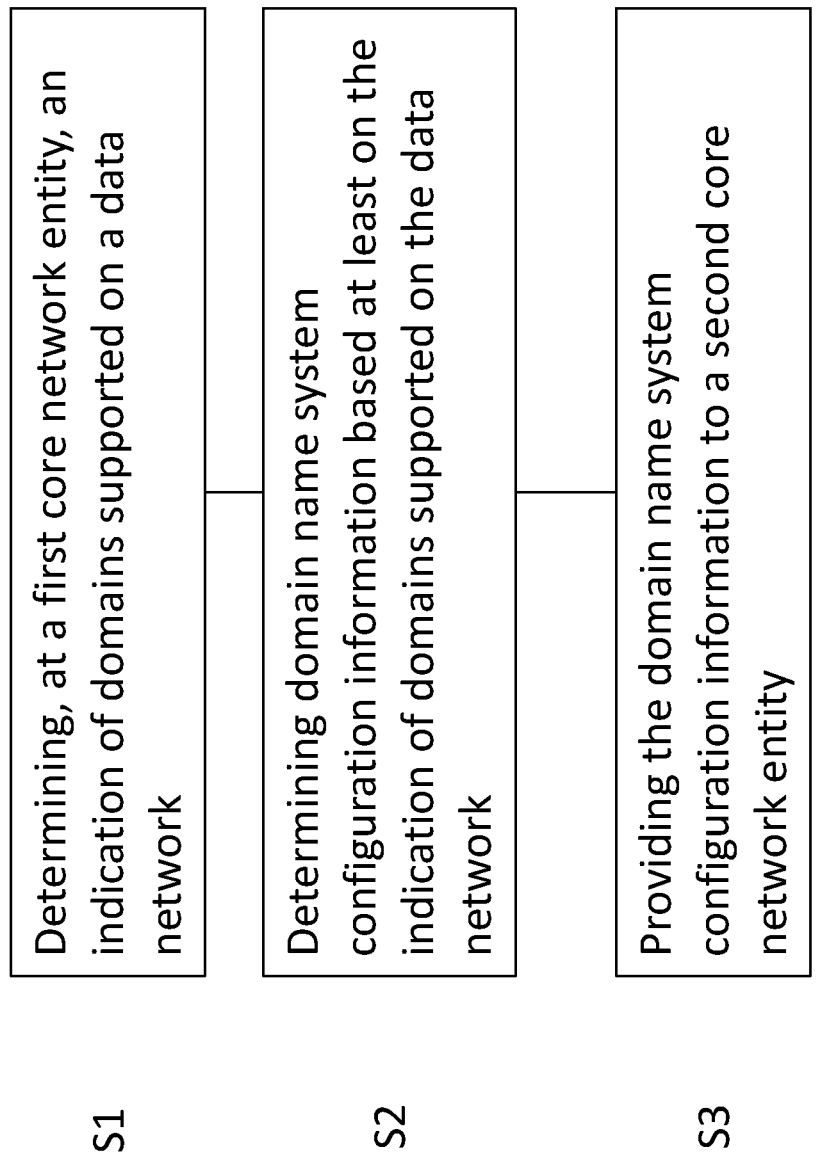
FIG. 5 shows a flowchart of a method according to an example embodiment.

FIG. 5 shows a flowchart of a method according to an example embodiment. The method may be performed at a first core network entity. The first core network entity may be a PCF. The second core network entity may be a SMF In a first step, S1, the method comprises determining, at a first core network entity, an indication of domains supported on a data network.

In a second step, S2, the method comprises determining domain name system configuration information based at least on the indication of domains supported on the data network In a third step, S3, the method comprises providing the first information to a second core network entity.

Figure 6:
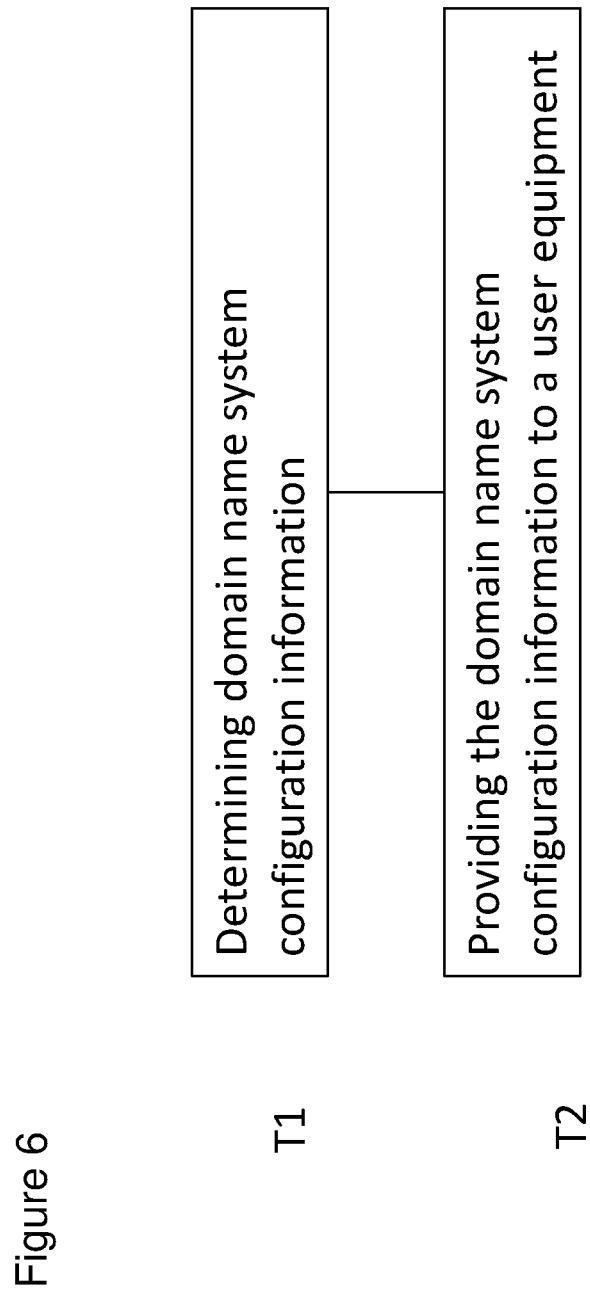
FIG. 6 shows a flowchart of a method according to an example embodiment.

FIG. 6 shows a flowchart of a method according to an example embodiment. The method may be performed at a second core network entity.

In a first step, T1, the method comprises determining domain name system configuration information.

In a second step, T2, the method comprises providing the domain name system configuration information to a user equipment.

Figure 7:
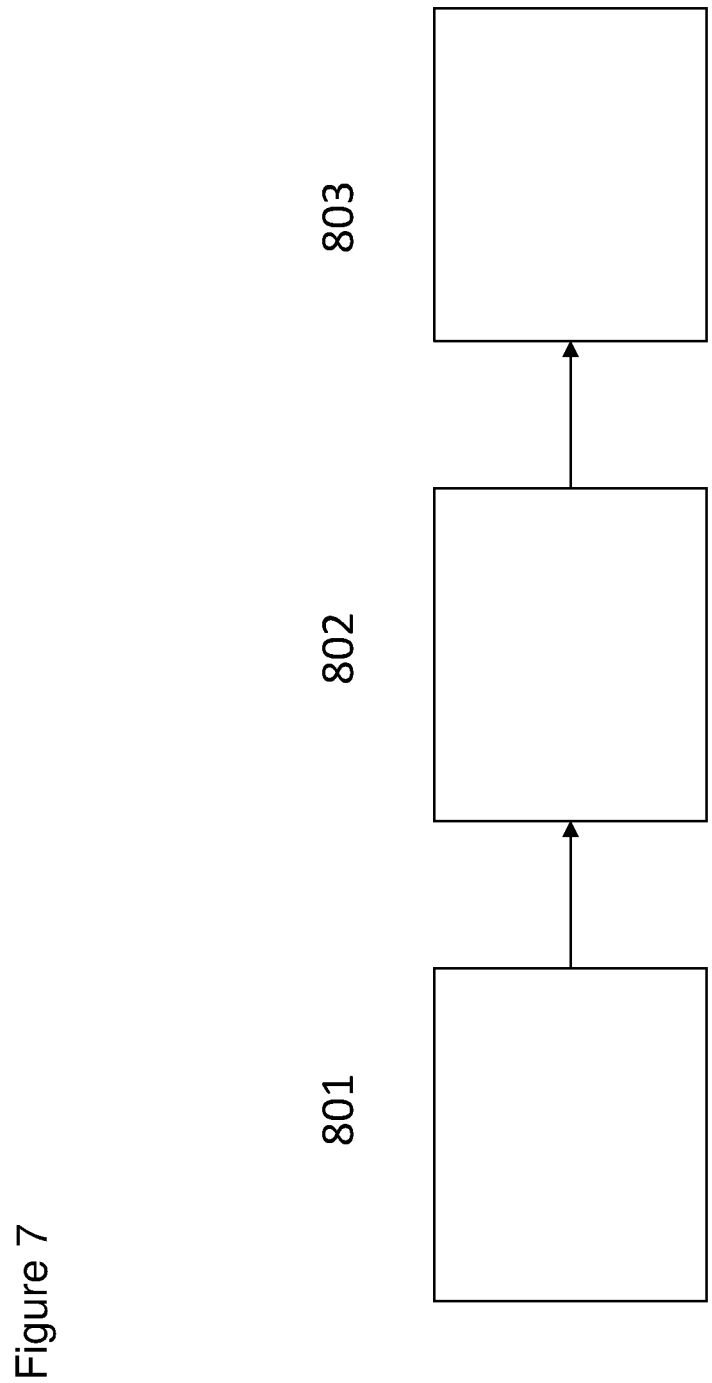
FIG. 7 shows a block diagram of a system according to an example embodiment.

FIG. 7 shows a block diagram of a system comprising an apparatus 801 comprising means for performing a method according to FIG. 5, which may be a PCF, an apparatus 802 comprising means for performing a method according to FIG. 6, which may be an SMF and an apparatus 803, which may be a UE.

The indication of the domains supported on the data network may comprise a list or an array of application domain information.

The list of domains (and networks) reachable by a DN or by a local access to the DN may be provided using a new parameter "appDomains" that consists of a list or an array of application domain information. Each application domain information may contain a Fully Qualified Domain Name (FQDN), such as "app.example.com", filter/rule corresponding to a FQDN (or set of FQDNs, with possible wildcarding such as such as "*.example.com"). The filter/rule may be associated with a filtering/rule priority. The application domain information may comprise (DNAI, DNS) priority.

The domains supported on the data network are domains reachable by the data network or by local access to the data network (identified by a DNAI as defined in 3GPP 23.501 § 5.6.7).

The method may comprise receiving the indication of domains supported on a data network from an application function. Alternatively, or in addition, the indication may be locally configured. That is, the first core network entity may be configured with a further indication of domains supported on the data network. The method may comprise determining which of the received indication of domains supported on the data network and the further indication of domains supported on the data network the domain name system configuration information is to be based on.

According to the example method, a 5GC can get information on the domains (e.g., a set of FQDN(s) supported on a local DN/local access to a DN) from an AF.

The information on the domains is translated by NEF/PCF into information about the domain supported by a (DNN, S-NSSAI) (where (DNN, S-NSSAI) refers to a Data Network identified by a DNN and a slice identified by a S-NSSAI where each of the DNN and S-NSSAI may be wildcarded).

An Application Function (AF) may invoke NEF API (Nnef_TrafficInfluence API or some other API to be defined) to communicate to 5GS the indication of domains (and networks) reachable by a DN or by a local access to the DN (DNAI). The AF may, for the access to a domain (or a set of domains) provide priority between access via different DNAI(s).

The AF may correspond to a third party (corporate DN) or to the AF controlling Edge Computing resources.

For example, for a PDU Session associated with a DN with corporate access, the FQDN(s) corresponding to corporate services may be associated with a higher priority than FQDN(s) for internet based services (when the corporate party also has an access to the Internet thus allowing also access internet based services but where access to internet based services would be possible with a higher priority by using another PDU Session not dedicated to corporate access).

The NEF may translate the AF identity into a target (DNN, S-NSSAI). The information from Nnef_TrafficInfluence API (possibly translated by NEF) may be stored in UDR and communicated to PCF via the same mechanisms than currently defined for Nnef_TrafficInfluence During or before SM Policy Association Establishment the PCF may acquire (and subscribe to notifications of change of) policy data from UDR including the "appDomains" information.

The PCF may alternatively, or in addition, be locally configured with "appDomains" information. The PCF is responsible for setting relative preferences between various "appDomains" information (whether it is locally configured or received from AF via the UDR).

The first core network entity may provide the domain name system configuration information as part of policy information to be sent to the user equipment. An SMF can send DNS Selection information to UE in order to guide UE selection of a proper DNS server. The DNS selection information may be based on Policy information received by SMF from PCF. A PCF ensures Co-ordination between information sent by different SMF for different (DNN, S-NSSAI) using the indication of domains supported on a data network.

In one example embodiment, a PCF transforms "appDomains" information into "DNS configuration information" to be provided to SMF. For the determination of "DNS configuration information" to be provided to SMF, the PCF may take into account locally configured policies related with (DNN, S-NSSAI), for example some (DNN, S-NSSAI) may be considered as default with lower priority and/or on some (DNN, S-NSSAI) information related with AF requests may be of higher priority.

The DNS configuration information is an indication of preferences for the DNS address(es) priorities sent to the UE. The domain name system configuration information may comprise at least one domain name system server address and an associated priority. The priority may be indicated by the order in which the DNS server address(es) are provided. The DNS configuration information may comprise the application domain information.

As part of Npcf_SMPolicyControl service (e.g. at Npcf_SMPolicyControl_Create Response) the PCF may provide "DNS configuration information" to the SMF. This does not correspond to a PCC rule but to PDU Session related policy information (to be defined in 3GPP TS 23.503 § 6.4). The "DNS configuration information" sent to SMF may be configured to apply for the whole PDU Session and/or to apply when local PSA to some DNAI(s) are configured.

Alternatively, or in addition, a second core network entity, e.g., SMF may use, on a low priority basis, locally configured information per (DNN, S-NSSAI) to determine DNS configuration information, for instance when dynamic PCC does not apply or when the SMF does not receive DNS configuration information from PCF e.g. because the PCF is from an older 3GPP release.

The second core network entity may provide the DNS configuration information to the UE using either 3GPP NAS/PCO (when requested by the UE in PCO) or DHCP (RFC 731) (when requested by the UE in a DHCP request) or Router Advertisement (RA) (RFC 8106) (in IPv6 case). The order by which the second core network entity sends DNS information in the RA (IETF RFC 8106) may provide an indication of priority to the UE. However, in order to use Router Advertisement option(s) defined in RFC 8106 for DNS Configuration, the indication of preference values for RDNSS address(es) should be updated to RFC 8106 in similar manner as preference values for RDNSS address(es) are expressed in RFC 6731.

Figure 8:
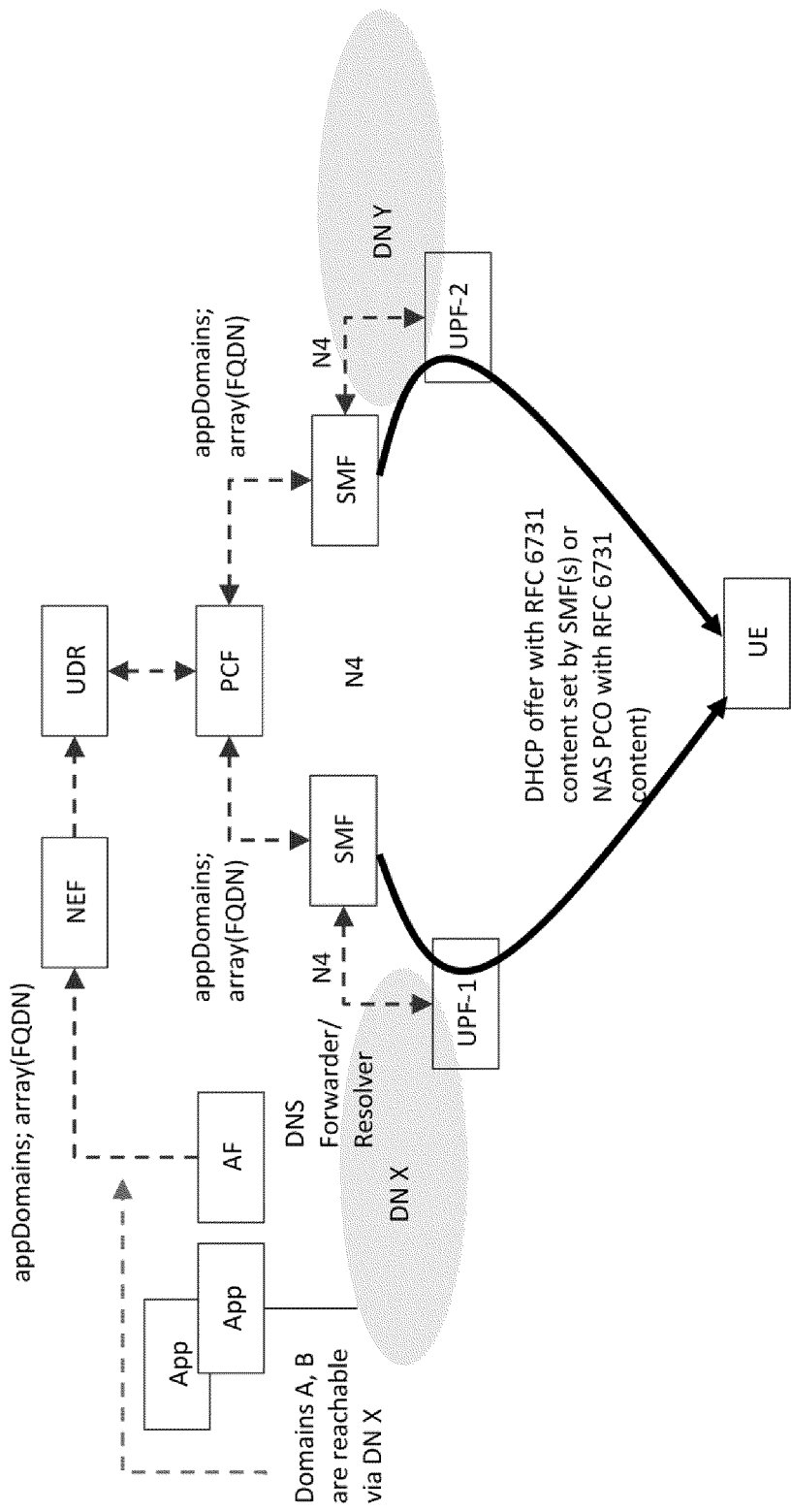
FIG. 8 shows a schematic diagram of an architecture according to an example embodiment.

FIG. 8 shows a schematic diagram of an example UE having multiple SMF and PDU sessions. In the example embodiment shown in FIG. 6, domains A and B are reachable via DN X. The AF provides the PCF (via the NEF and UDR) with this information as appDomains (a list or an array of application domain information as defined above). The PCF transforms (based on local policies) "appDomains" information into "DNS configuration information" to be provided to SMF.

The SMF may send to the UE information on the DNS server reachable via the PDU Session with complementary information per IETF RFC 6731 ("Improved Recursive DNS Server Selection for Multi-Interfaced Nodes").

The PCF may decide the priorities to be set to DNS server address(es) communicated to the UE.

The SMF may provide the DNS configuration information to the UE when acting as a DHCP server or using NAS (e.g. TS 24.501) Extended Protocol Configuration options sent e.g. in PDU Session Establishment Response.

The PCF may directly provide DNS configuration information including RDNSS address(es), preferences for each communicated RDNSS address and list of specific domains (and network), i.e. appDomains, as part of UE Route Selection Policy information communicated to UE.

In case of different SMF (or SMF sets) serving different (DNN, S-NSSAI), an SMF may use the PCF selected by the AMF for the UE or use the PCF Group ID provided by the AMF to the SMF (as defined in TS 23.501-g30 clause 6.3.7.1).

Figure 9:
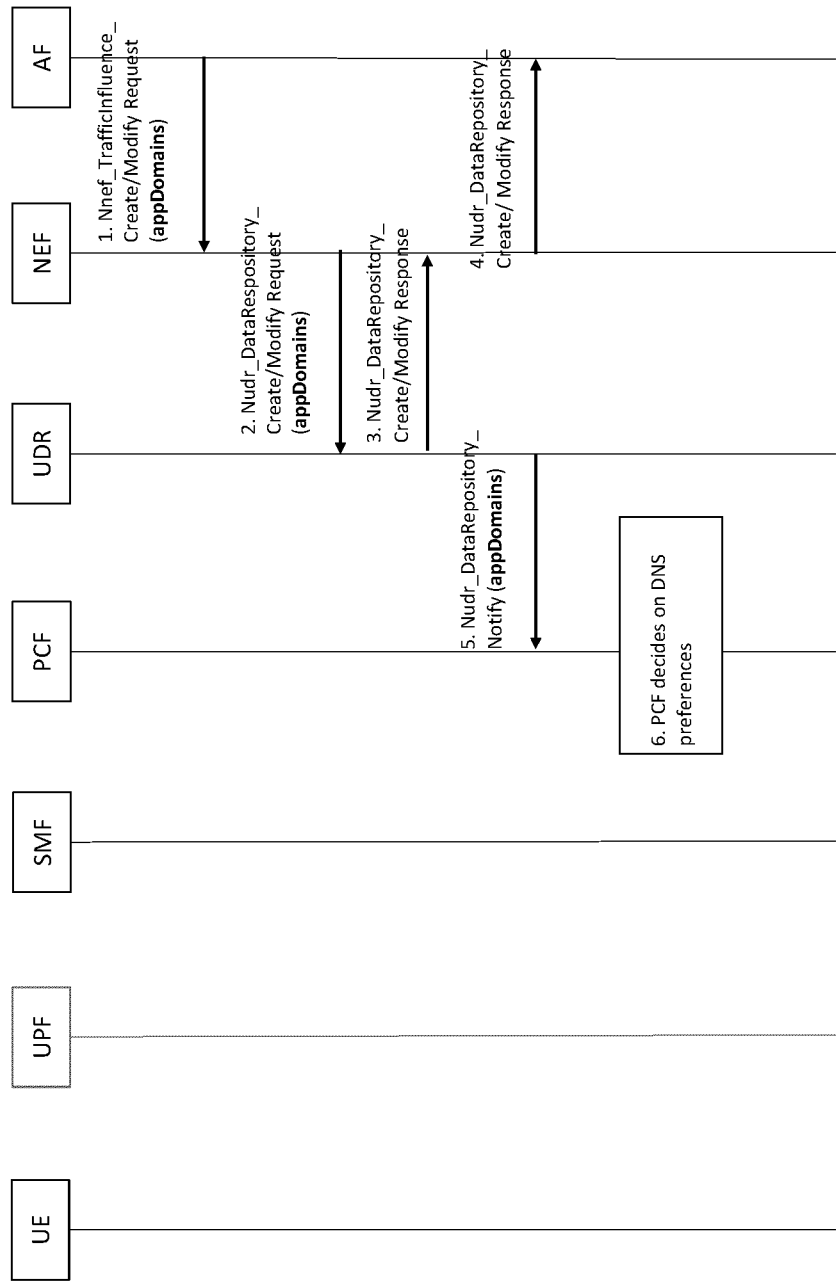
FIG. 9 shows a signalling flow according to an example embodiment.

FIG. 9 illustrates a signalling flow according to an example embodiment for the configuration of application specific domains (appDomains) via Network Exposure Function (NEF) to the 5GS using an existing 3GPP mechanism (as defined in TS 23.502 clause 4.3.6.2). In the figure Nnef_TrafficInfluenceAPI is depicted, however also a new API (to be defined) may be used.

In step 1, an Application Function (AF) invokes NEF API (Nnef_TrafficInfluence API or some other API to be defined) to communicate appDomains (a list or an array of application domain information as defined above)) to Network Exposure Function (NEF). The NEF may translate the AF identity into a target (DNN, S-NSSAI).

In step 2, the NEF stores the information from the API (possibly translated by NEF) including appDomains to Unified Data Repository (UDR).

In step 3, the UDR responds to NEF.

In step 4, the NEF responds to the AF.

In step 5, the PCF may acquire (and subscribe to notifications on change of) policy data from UDR including the "appDomains" information.

The PCF(s) that have subscribed to notification on modifications of AF requests (Data Set=Application Data; Data Subset=AF traffic influence request information, Data Key=S-NSSAI and DNN) receive(s) a Nudr_DM_Notify notification of data change from the UDR. Potentially also Internal Group Identifier or SUPI may be included in Data Key if AF also provides external identity of individual UE or group of UE instead of anyUEInd indication that the request applies to any UE).

In step 6, the PCF decides on DNS preferences as outlined above. The PCF may then use the information to provide it to SMF as shown in FIG. 4 or to build URSP sent to UE.

Figure 10:
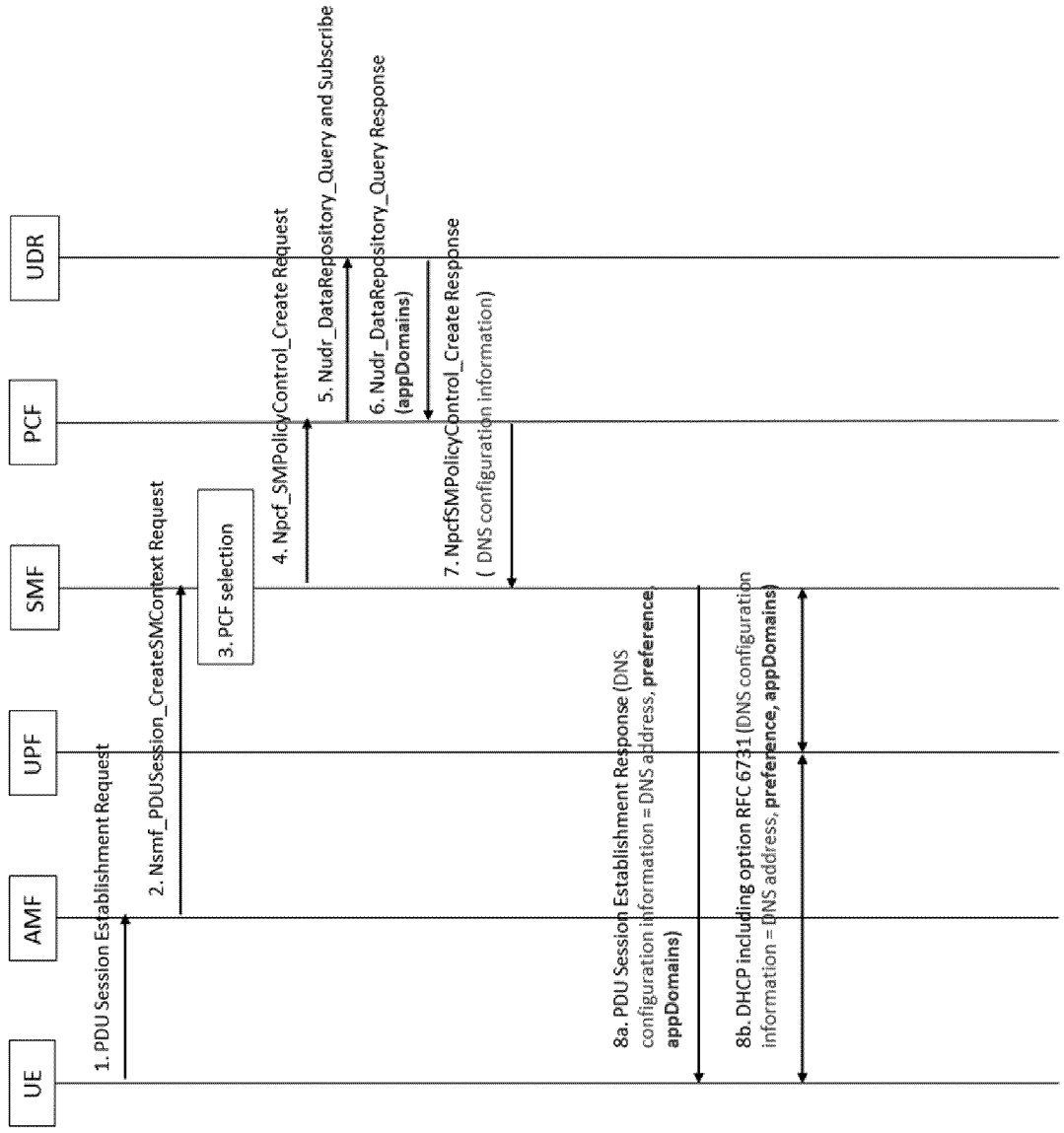
FIG. 10 shows a signalling flow according to an example embodiment.

FIG. 10 illustrates an example signalling flow for SMF influence on preferences and domains and networks for multiple Recursive DNS Servers.

In step 1, the UE initiates the UE Requested PDU Session Establishment procedure by the transmission of a NAS message containing a PDU Session Establishment Request within the N1 SM container.

In step 2, AMF selects an SMF and sends Nsmf_PDUSession_CreateSMContext Request to SMF.

In step 3, SMF selects PCF taking into account what is described in this disclosure of PCF ID or PCF Group ID In step 4, SMF establishes a SM Policy Association with the PCF by invoking Npcf_SMPolicyControl_Create operation providing the DNN and the S-NSSAI of the PDU Session In step 5, if the PCF does not have policy data for the (DNN, S-NSSAI) of the PDU Session, it sends a corresponding request to the UDR by invoking Nudr_DataRepository_Query operation. The PCF may request notifications from the UDR about changes on the corresponding policy information (including appDomains mapped to DNN and S-NSSAI) by invoking Nudr_DataRepository_Subscribe.

In step 6, the UDR responds to PCF with Nudr_DataRepository_Query response including appDomains that includes the list specific domains (and networks).

In step 7, the PCF responds to SMF with Npcf_SMPolicyControl_Create response including DNS Configuration information.

In step 8, the SMF communicates the DNS Configuration information in PDU Session Establishment Response by including DNS Configuration information in Extended PCO IE (8.a) or when acting as DHCP client/server by including in DHCP RDNSS option when communicating with UE using DHCP (8.b) or in RA (per RFC 8106).

If the PCF determines that DNS Configuration information has changed (because e.g. appsDomains information changed), the PCF may provide a new DNS Configuration information as part of a Npcf_SMPolicyControl_Update. The SMF may provide the corresponding information to the UE via NAS PCO sent in a network initiated PDU Session modification procedure, Router Advertisement ('RA' per IETF RFC 8106) (in IPv6 case) or DHCP FORCERENEW and DHCP INFORM defined in DHCP reconfigure extension (RFC 3203) that are subject to authentication of DHCP message as defined in RFC 3118 forcing the UE to get again the DNS configuration via DHCP.

In one example embodiment, the appDomains information configured on PCF by mechanisms may be used to generate URSP sent to the UE. The semantics of the application of URSP rules may be extended. A DNS query to a domain is in this extension considered as an application request, and as such can be subject to URSP where it is used to select a PDU Session. For instance, by matching FQDN within the DNS query with domain descriptor(s) in URSP could be used to select a PDU Session. Once the PDU Session has been selected, the corresponding DNS information (associated with the IP link corresponding to the PDU session) is then used by the UE.

An apparatus may comprise means for determining, at a first core network entity, an indication of domains supported on a data network, determining domain name system configuration information based at least on the indication of domains supported on the data network and providing the domain name system configuration information to a second core network entity.

Alternatively, or in addition, an apparatus may comprise means for determining domain name system configuration information and providing the domain name system configuration information to a user equipment.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. A method comprising: determining, at a first core network entity, an indication of domains supported on a data network, wherein the indication of the domains supported on the data network comprises a list and an array of application domain information and the domains supported on the data network are domains reachable by the data network and by local access to the data network; determining domain name system configuration information based at least on the indication of domains supported on the data network; and providing the domain name system configuration information to a second core network entity, wherein the method further comprises: providing the domain name system configuration information as part of policy information to be sent to the user equipment; receiving the indication of domains supported on the data network from an application function; providing the domain name system configuration information as part of policy information to be sent to the user equipment: wherein the first core network entity is configured with a further indication of domains supported on the data network and the method further comprises determining which of the received indication of domains supported on the data network and further indication of domains supported on the data network the domain name system configuration information is to be based on, wherein the first core network entity is a policy control function and the second core network function is a session management function and the domain name system configuration information comprises a domain name system server address associated with the data network and an associated priority, wherein the list of domains reachable by a data network or by a local access to the data network is provided using a parameter comprising the list and the array of application domain information and wherein each application domain information includes a fully qualified domain name (FQDN) and a filter corresponding to a set of FQDNs, the filter being associated with a filtering priority, and wherein the method further comprises transforming the parameter into DNS configuration information to be provided to the session management function based on locally configured policies wherein some configuration information is categorized as a default policy with a lower priority and some configuration information is categorized with a higher priority.

2. An apparatus comprising: at least one processor and at least one memory including a computer program code, the at least one memory and computer program code configured to, with the at least one processor, cause the apparatus at least to: determine, at a first core network entity, an indication of domains supported on a data network, wherein the indication of the domains supported on the data network comprises a list and an array of application domain information and the domains supported on the data network are domains reachable by the data network and by local access to the data network; determine domain name system configuration information based at least on the indication of domains supported on the data network; and provide the domain name system configuration information to a second core network entity wherein the at least one memory and computer program code are further configured to, with the at least one processor, cause the apparatus to: provide the domain name system configuration information as part of policy information to be sent to the user equipment: receive the indication of domains supported on the data network from an application function; wherein the first core network entity is configured with a further indication of domains supported on the data network and wherein the at least one memory and computer program code are further configured to, with the at least one processor, cause the apparatus to determine which of the received indication of domains supported on the data network and the further indication of domains supported on the data network the domain name system configuration information is to be based on, wherein the first core network entity is a policy control function and the second core network function is a session management function and the domain name system configuration information comprises a domain name system server address associated with the data network and an associated priority, wherein the list of domains reachable by a data network or by a local access to the data network is provided using a parameter comprising the list and the array of application domain information and wherein each application domain information includes a fully qualified domain name (FQDN) and a filter corresponding to a set of FQDNs, the filter being associated with a filtering priority, and wherein the at least one memory and computer program code are further configured to, with the at least one processor, cause the apparatus to transform the parameter into DNS configuration information to be provided to the session management function based on locally configured policies wherein some configuration information is categorized as a default policy with a lower priority and some configuration information is categorized with a higher priority.

3. A non-transitory computer readable medium comprising program instructions for causing an apparatus to perform at least the following: determining, at a first core network entity, an indication of domains supported on a data network, wherein the indication of the domains supported on the data network comprises a list and an array of application domain information and the domains supported on the data network are domains reachable by the data network and by local access to the data network; determining domain name system configuration information based at least on the indication of domains supported on the data network; and providing the domain name system configuration information to a second core network entity, the non-transitory computer readable medium further comprising program instructions for causing an apparatus to: provide the domain name system configuration information as part of policy information to be sent to the user equipment: receive the indication of domains supported on the data network from an application function: wherein the first core network entity is configured with a further indication of domains supported on the data network and wherein the non-transitory computer readable medium further comprises program instructions for causing an apparatus to perform at least determining which of the received indication of domains supported on the data network and the further indication of domains supported on the data network the domain name system configuration information is to be based on, wherein the first core network entity is a policy control function and the second core network function is a session management function and the domain name system configuration information comprises a domain name system server address associated with the data network and an associated priority, wherein the list of domains reachable by a data network or by a local access to the data network is provided using a parameter comprising the list and the array of application domain information and wherein each application domain information includes a fully qualified domain name (FQDN) and a filter corresponding to a set of FQDNs, the filter being associated with a filtering priority, and wherein the non-transitory computer readable medium further comprises program instructions for causing an apparatus to perform at least transforming the parameter into DNS configuration information to be provided to the session management function based on locally configured policies wherein some configuration information is categorized as a default policy with a lower priority and some configuration information is categorized with a higher priority.

* * * * *